R. E. DARNLEY.
APPARATUS FOR INFLATING ROTATING TIRES.
APPLICATION FILED JAN. 30.
1,040,643.
Patented Oct. 8, 1912.
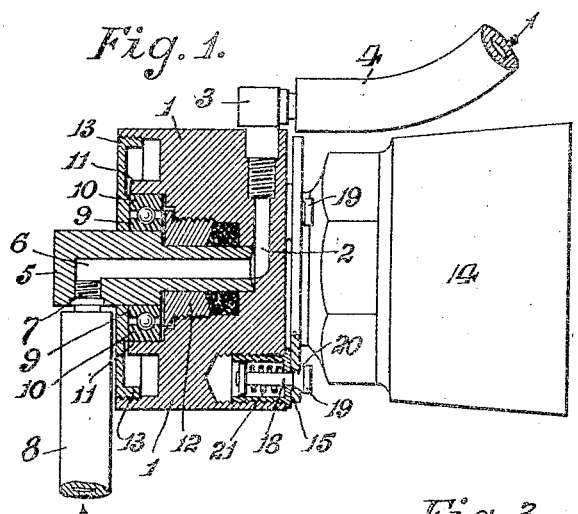
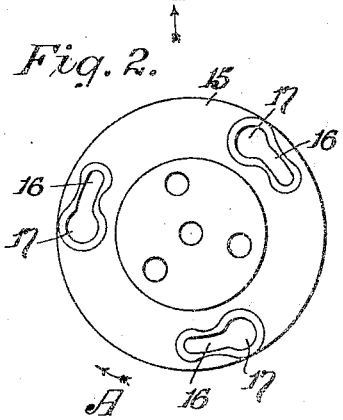
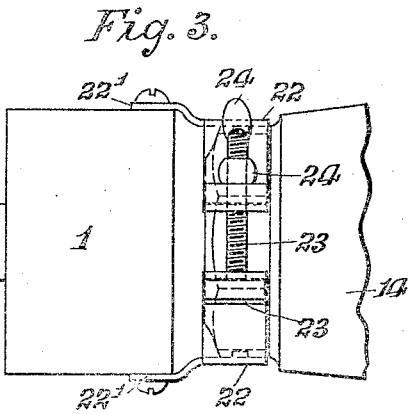
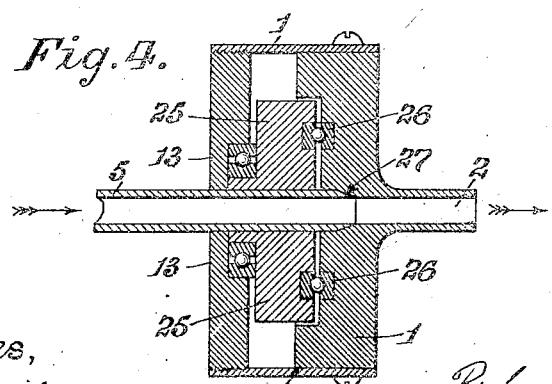
Witnesses,
S. H. Davis.
W. L. Burch
Inventor,
Richard E. Darnley
by Herbert W. Jenner.
Attorney.

UNITED STATES PATENT OFFICE.

RICHARD E. DARNLEY, OF HUDDERSFIELD, ENGLAND.

APPARATUS FOR INFLATING ROTATING TIRES.

1,040,643. Specification of Letters Patent. Patented Oct. 8, 1912.

Application filed January 30, 1912. Serial No. 674,358.

*To all whom it may concern:*

Be it known that I, RICHARD EDWARD DARNLEY, a subject of King George V of Great Britain, residing at Huddersfield, in the county of York, England, have invented certain new and useful Improvements in Apparatus for Inflating Rotating Tires, of which the following is a specification.

This invention relates to motor vehicles, wagons or the like and has for its object the provision of new and improved means adapted to be applied to the wheels of such vehicles and connected with an air compressor or compressed air chamber on the vehicle to supply air under pressure to a punctured or deflated tire while the vehicle is in motion and thus maintain a substantial air pressure in the tire for any reasonable time to enable the vehicle to complete the journey without the necessity of stopping to repair the tire or of removing the wheel concerned and applying a spare wheel in its place.

My invention consists broadly in providing a device having one part, which is to be coupled or connected with the valve of the tire, adapted to revolve freely with the wheel and a second part, which is to be coupled or connected to an air compressor or compressed air chamber, adapted to remain stationary, there being a thoroughfare or conduit affording communication between the two parts so that when the device is attached to the wheel and coupled with the compressed air supply, air under pressure is forced through the valve into the air tube of the tire as the vehicle travels along, the air supplied in this way compensating for the leakage resulting from puncture or other cause and thereby maintaining the tire fully inflated or sufficiently inflated to admit of the vehicle continuing its journey without repairing the tire.

In the accompanying drawings:—Figure 1 is a sectional elevation of one embodiment of my invention showing the device detachably secured to the hub cap of a motor vehicle wheel; Fig. 2 is a face view of one form of locking plate employed in the mode of detachably securing the device to the wheel shown in Fig. 1; Fig. 3 shows an alternative means by which the device may be detachably secured to the wheel, and Fig. 4 is a sectional elevation of a modified embodiment of the invention.

Referring to the drawings, and firstly to the embodiment of my invention shown at Fig. 1, the device comprises, in this instance, a casing 1 having a conduit 2 connected by a nipple 3 to a flexible tube 4 whose opposite end is suitably connected to the air valve of the tire of the wheel to which the device is applied. Supported within the casing 1 is the inner end of a tube or spindle 5 having a thoroughfare or conduit 6, the outer end of said tube or spindle being connected by a nipple 7 to a flexible tube 8 leading to a suitable air compressor driven by the motor mechanism of the vehicle or to a compressed air storage chamber carried on the vehicle. The tube or spindle 5 has fast thereon the inner ball race 9 of a suitable ball bearing, the outer ball race 10 of which fits neatly within an annular flange 11 in the casing and forms a driving fit therewith, the casing thus being capable of revolving freely around the part 5 which remains stationary. A suitable gland or stuffing box 12 prevents leakage of air from the joint between the inner end of the tube or spindle 5 and the conduit 2. A suitable cover 13 closes the end of the casing and maintains the spindle or tube 5 in position.

In the arrangement shown at Figs. 1 and 2, a locking plate 15 is centrally secured by screws or other means on the outer end of the hub cap. Formed in this locking plate are a series of circumferential slots 16 terminating in openings 17 of greater width than the said slots. The casing 1 is provided with a series of spring plungers 18 corresponding in number and disposition to the slots 16, the said plungers being provided with enlarged heads 19 whose inner sides are tapered as at 20. In attaching the casing to the wheel, the heads of the plungers are passed through the openings 17 and the casing given a partial rotation in the direction of the arrow A, Fig. 2, to carry the plungers around within the slots. The sides of the openings 17 are countersunk and coöperate with the tapered portions 20 on the plungers to cause the said plungers to be partly withdrawn against the pressure of light springs 21, and the opposite ends of the slots are also countersunk, so that on the plungers arriving at the inner ends of the slots, they are partly drawn back and act to lock the casing firmly to the hub cap. The locking plates on one side of the vehicle would have the slots pointing in one direction and those on the other side have them pointing in the opposite direction, so that the rotation of the wheels always tends to maintain the plungers at the inner ends of the slots.

An alternative method of detachably securing the casing to the wheel hub is shown at Fig. 3. In this instance a clip or metal strap 22 adapted to encircle the angular portion of the hub cap and to be gripped thereon by means of a bolt 23 and nut 24 is attached by lugs 22', 22', to the casing 1.

The above described methods of attaching the device to a wheel hub are only given by way of example, and I do not limit myself to them or to any particular method of attaching the device to the hub. The casing 1 and tube 4 are carried bodily around with the wheel, the casing revolving freely while the air supply tube or spindle 5 remains stationary.

When not required for use, the device can be carried in the pocket or in the tool box of the vehicle, and in the event of a puncture or leakage of air occurring the device can be attached to the hub of the wheel concerned, the tube 4 connected to the air valve of the tire and the tube 8 connected to the air compressor or to the compressed air storage chamber.

Separate tubes from the air compressor or storage chamber may be provided for each wheel, or a single tube or pair of tubes may suffice.

In the modified construction shown at Fig. 4, the air supply tube or spindle 5 has a disk 25 which is pressed by the cover 13 against a ball bearing 26 between same and the inner face of the end of the casing. In this instance the inner end of the supply pipe or tube 5 is beveled or tapered as at 27 and fits against a correspondingly beveled or tapered face or seat in the casing, a stuffing box being dispensed with.

By the means described, air can be supplied under pressure to a punctured or leaky tire for any length of time or until the tire can be repaired without interfering with or delaying the journey.

Having thus described my invention, what I claim as new and desire to secure by Letters Patent is:—

The combination, with a wheel hub, of a casing secured to the hub and provided with a chamber arranged axially in line with the hub, said casing having an air outlet at one end for connection with the wheel tire, and having also an annular recess and a removable cover at its other end, an air inlet tube projecting through the said cover and mounted axially in the said chamber and provided with means for holding it in airtight relation with the said outlet, an outer ball race secured in the said recess inside the casing, an inner ball race secured on the said tube inside the casing, and balls running in the said ball races, the said cover being arranged to bear against the inner ball race and thereby prevent it and the air inlet tube from sliding longitudinally in the casing.

In testimony whereof I affix my signature in the presence of two witnesses.

RICHARD E. DARNLEY.

Witnesses:
THOMAS H. BARRON,
FRANK LEWIN.